US006442210B1

(12) United States Patent
Pennell

(10) Patent No.: US 6,442,210 B1
(45) Date of Patent: Aug. 27, 2002

(54) APPARATUS FOR AC-TO-DC CONVERSION WHICH PROVIDES A SIGNED DC SIGNAL

(75) Inventor: John D. Pennell, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 09/911,812

(22) Filed: Jul. 24, 2001

Related U.S. Application Data

(60) Provisional application No. 60/220,354, filed on Jul. 24, 2000.

(51) Int. Cl.[7] .......................... H04L 27/00; H04L 27/02

(52) U.S. Cl. ....................................... 375/259; 375/268

(58) Field of Search ................................ 375/239, 268, 375/269

(56) References Cited

U.S. PATENT DOCUMENTS 4,651,130 A * 3/1987 Pennell ........................ 318/656
4,937,523 A 6/1990 Duverger et al. ....... 324/207.18
5,940,447 A * 8/1999 Connell et al. ............. 235/379
5,982,297 A * 11/1999 Welle ..................... 340/870.16
6,037,704 A * 3/2000 Welle ..................... 310/316.01
6,127,942 A * 10/2000 Welle ..................... 340/870.16
6,285,719 B1 * 9/2001 Sobel .......................... 329/361

* cited by examiner

*Primary Examiner*—Bao Q. Vu

(57) ABSTRACT

An AC-to-DC converter obtains phase and amplitude signal information from a displacement transducer that is excited by an AC excitation signal and provides an AC sensor signal indicative of transducer position. The converter includes a first rectifier circuit that receives and sums the AC excitation signal and the AC sensor signal, and rectifies the sum to provide a rectified summed excitation and input signal indicative thereof. A second rectifier circuit receives and rectifies the AC excitation signal, and provides a rectified excitation signal indicative thereof. A summing circuit computes the difference between the rectified summed excitation and input signal and the rectified excitation signal, and provides a signed DC signal indicative of displacement transducer position. Advantageously, the AC-to-DC converter of the present invention performs summing and difference functions directly and provides a signed DC signal representative of the AC amplitude and phase input of the transducer output, thus eliminating the need for an analog-to-digital converter (ADC) and the support of an associated processor.

11 Claims, 3 Drawing Sheets

APPARATUS FOR AC-TO-DC CONVERSION WHICH PROVIDES A SIGNED DC SIGNAL

CROSS REFERENCE TO RELATED APPLICATIONS

This application claims priority from the provisional application designated Ser. No. 60/220,354 filed Jul. 24, 2000 and entitled "Apparatus for AC-to-DC Conversion Which Provides a Signed DC Signal", which is hereby incorporated by reference.

BACKGROUND OF THE INVENTION

The present invention relates generally to the field of analog signal conditioning, and in particular to AC-to-DC converters for converting AC displacement sensor signals to a DC signal.

A linear variable differential transformer (LVDT) provides an electrical output signal that is proportional to the displacement of a separate moveable iron core. An LVDT uses three windings and the moveable iron core to sense linear displacement. A primary winding, two secondary windings, and the moveable iron core are energized at the primary with an alternating current (AC). The two secondary windings are connected in series opposition, such that the transformer output is the difference of the two secondary voltages. When the core is centered, the two secondary voltages are equal and the transformer output is zero. This is the balanced or null position. When the core is displaced from the null point, the two secondary voltages are no longer equal in magnitude and the transformer produces an output voltage. Motion of the core in the opposite direction produces a similar effect with 180° phase reversal of the alternating output voltage, i.e., the phase angle is positive (no phase shift with respect to the excitation) or negative (180° phase shift with respect to the excitation) depending on which side of null the core is positioned. A demodulator circuit can be used to produce a DC output from this winding configuration. Differential transformers are also available in a rotary version (e.g., an RVDT) for angular measurement in which the core rotates about a fixed axis. A detector is normally used for sensing phase reversal when passing through the null point.

Other winding configurations are used in synchros, resolvers and microsyns.

The construction of a synchro is similar to that of a three-phase synchronous motor or generator. The stator contains a three-phase winding and the rotor is excited with a constant single phase AC voltage while the shaft moves at low speeds or stays stationary. Basically the synchro is a transformer with one primary (the rotor) and three-secondaries (the Y-connected windings of the stator). The voltages induced in the secondary windings are proportional to the cosines of the angles between each stator coil and the rotor.

A resolver synchro is similar to a synchro generator in construction, but the stator contains only two windings oriented at 90° relative to each other, and they are employed to resolve rotor position into sine and cosine component voltage signals.

The various types of displacement sensors may be used in computing servomechanisms and other electromechanical computers. When used in digital computers, it is often necessary to convert the analog signal information into digital words for use by the signal processor. Usually, a rectification process is utilized to convert time-varying secondary output signals, having a zero average, into a rectified signal having a DC average value. Unfortunately, this process destroys the phase information contained in the secondary output signals. Unless the information is extracted before rectification and later converted to useful digital information as well, the displacement sensor will necessarily be restricted to operation in a limited range. Thus, an LVDT would be restricted to use on one or the other side of the null point while a synchro resolver would be restricted to operation in one quadrant only.

U.S. Pat. 4,561,130 assigned to the assignee of the present invention discloses an apparatus and method for retaining both amplitude and phase information in the signal derived from the secondary coils of a multiple-coil inductive displacement sensor and applied to a rectifier for conversion to a digital format. This technique involves summing the time varying input with a reference time varying signal. The resultant summed signal is then rectified and digitized. The reference signal is also rectified and digitized. The processor reads the digital value of the converted reference signal and the digital value of the converted summed signal and computes the difference to provide a signed digital value. Significantly, although this technique provides both signal phase and amplitude with the signed digital value, this technique requires an analog-to-digital converter (ADC) and a processor to perform the subtraction.

Therefore, there is a need for a simpler and less expensive technique for recovering the transducer output signal phase and amplitude information.

SUMMARY OF THE INVENTION

Briefly, according to an aspect of the present invention, an AC-to-DC converter obtains phase and amplitude signal information from a displacement transducer that is excited by an AC excitation signal and provides an AC sensor signal indicative of transducer position. The converter includes a first rectifier circuit that receives and sums the AC excitation signal and the AC sensor signal, and rectifies the sum to provide a rectified summed excitation and input signal indicative thereof. A second rectifier circuit receives and rectifies the AC excitation signal, and provides a rectified excitation signal indicative thereof. A summing circuit computes the difference between the rectified summed excitation and input signal and the rectified excitation signal, and provides a signed DC signal indicative of displacement transducer position.

Advantageously, the AC-to-DC converter of the present invention performs summing and difference functions directly and provides a signed DC signal representative of the AC amplitude and phase input of the transducer output, thus eliminating the need for an analog-to-digital converter (ADC) and the support of an associated processor.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
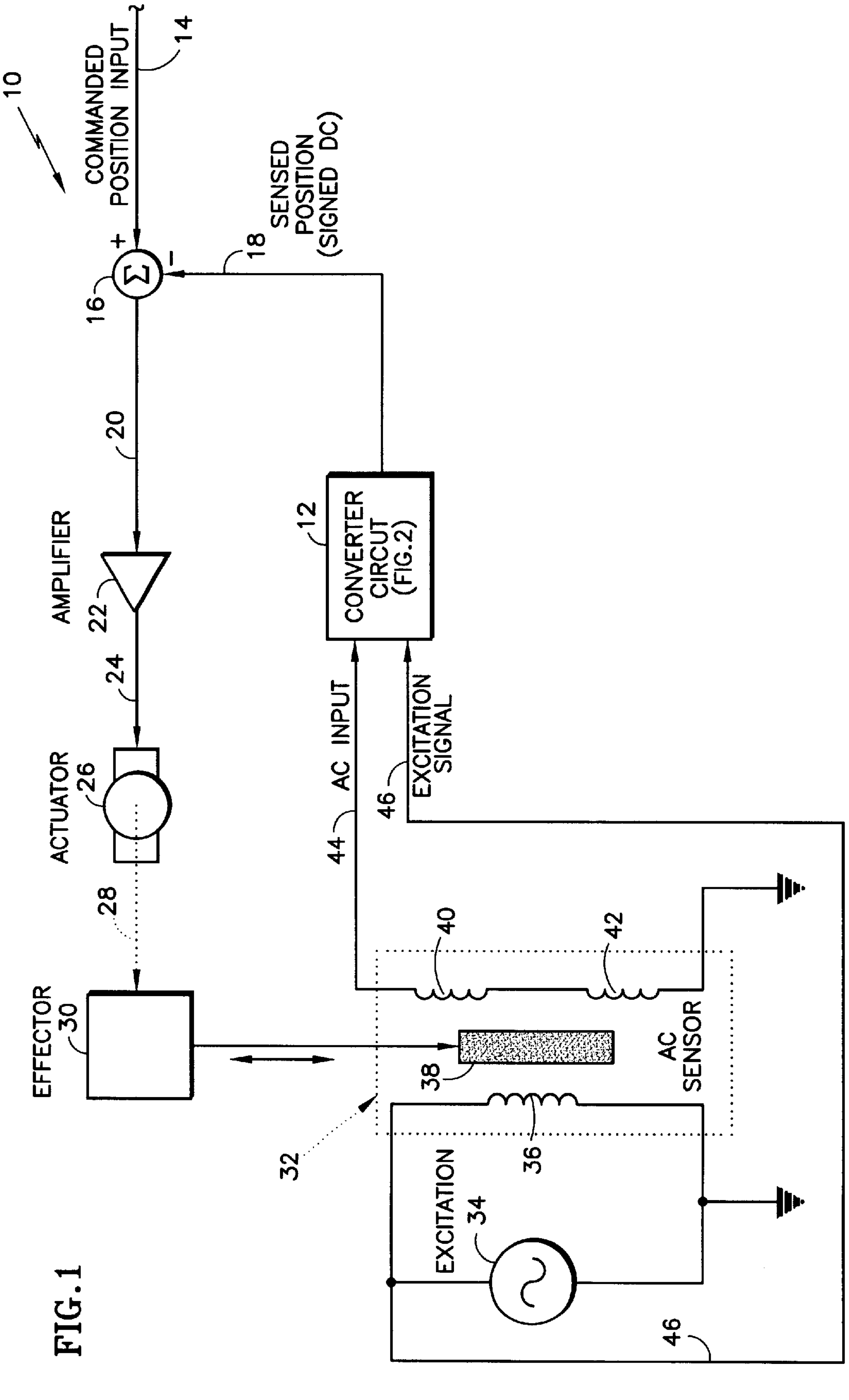
FIG. 1 is a block diagram illustration of a servomechanism that employs an AC-to-DC converter circuit according to the present invention.

FIG. 1 is a block diagram illustration of a servo-mechanism 10 that employs an AC-to-DC converter circuit 12 according to the present invention. The servo-mechanism 10 receives a commanded position signal on a line 14. This signal is typically generated by an electronic control system (not shown). A summer 16 computes the difference between the commanded position signal on the line 14 and a sensed feedback position signal on a line 18, and provides a position error signal on a line 20 indicative of the difference. The error signal is input to an amplifier circuit 22 that provides an amplified error signal on line 24 to an actuator 26 (e.g., a brushless DC motor). In one embodiment the amplifier circuit 22 may include an H-bridge driver.

The actuator 26 is coupled to and controls an effector 30. To close the loop on the position of the effector 30, the servo-mechanism 10 also includes a displacement transducer 32 (e.g., an LVDT) to sense the position of the effector 30. The transducer 32 receives an AC excitation signal from a source 34, and applies the excitation signal across a primary winding 36. As known, this type of displacement transducer provides an AC output signal whose magnitude is proportional to the displacement of a separate movable iron core 38 coupled to the effector. The transducer 32 includes identical secondary windings 40, 42 connected in series opposition that are symmetrically spaced from the primary winding 36. Movement of the iron core 38 varies the mutual inductance of each secondary winding 40, 42, which determines the voltage induced from the primary winding to each secondary winding. If the iron core 38 is centered between the secondary windings, the voltage induced in each secondary is identical and 180° out of phase, and therefore the transducer output signal on line 44 is zero VRMS. When the iron core 38 is off center, a non-zero transducer output signal proportional to the position of the iron core is output on the line 44.

The converter circuit 12 receives the transducer output signal on the line 44 and the excitation signal on a line 46. The converter circuit processes these signals to provide the sensed position signal on the line 18 indicative of position, which is a signed DC signal. That is, the signal may be a positive or negative DC value.

Figure 2:
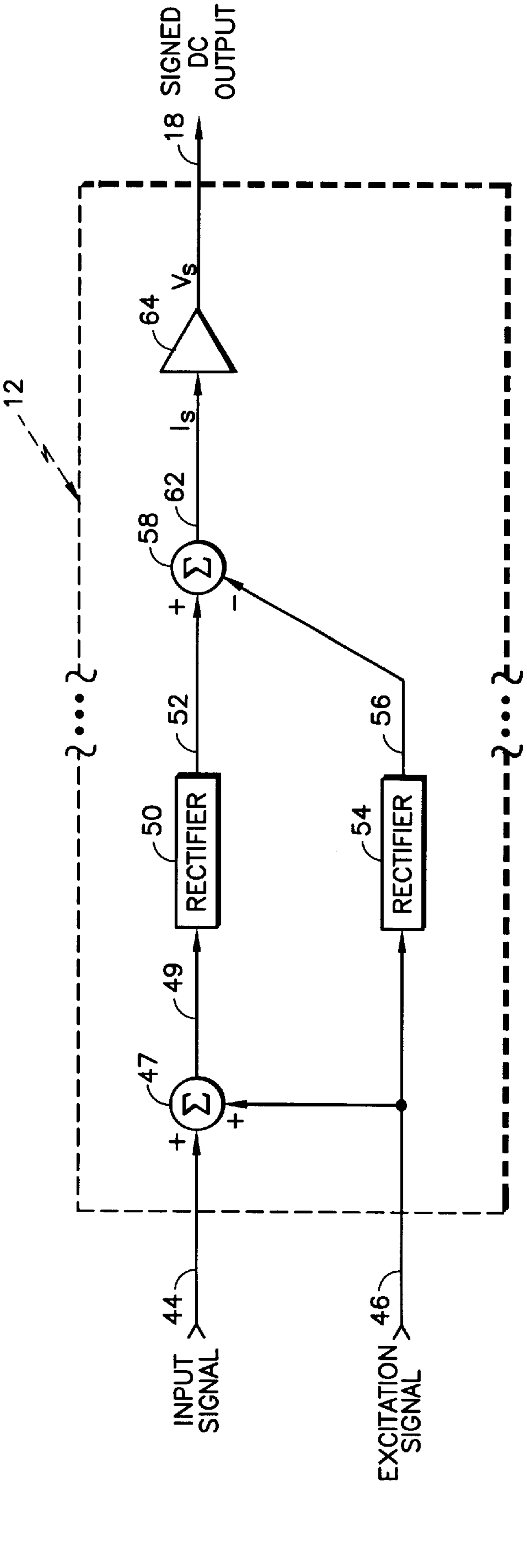
FIG. 2 is a block diagram illustration of the converter circuit.

FIG. 2 is a block diagram illustration of the conversion circuit 12 suitable for used with an LVDT. As known, the output voltage of an LVDT is a linear function of core displacement within a specified range of motion. In addition, the LVDT also has the characteristic that the phase angle of the output voltage is essentially constant through each half of its nominal linear range, and an abrupt 180° reversal in phase takes place as the iron core passes through its null position.

The input signal on the line 44 and the excitation signal on the line 46 are input to a summer 47, and the summer provides a summed signal on a line 49. Rectifier 50 receives the summed signal and rectifies the signal to provide a rectified summed excitation and input signal on a line 52. The AC excitation signal on the line 46 is input to a rectifier 54 that provides a rectified summed excitation signal on a line 56. The conversion circuit also includes a summer 58 that receives the rectified excitation and input signal on the line 52 and the rectified excitation signal on the line 56, and provides a summed current signal on a line 62 that is connected by circuit 64 to a signed DC output signal indicative of the difference between the signals, and representative of the position of the effector 30 (FIG. 1).

Figure 3:
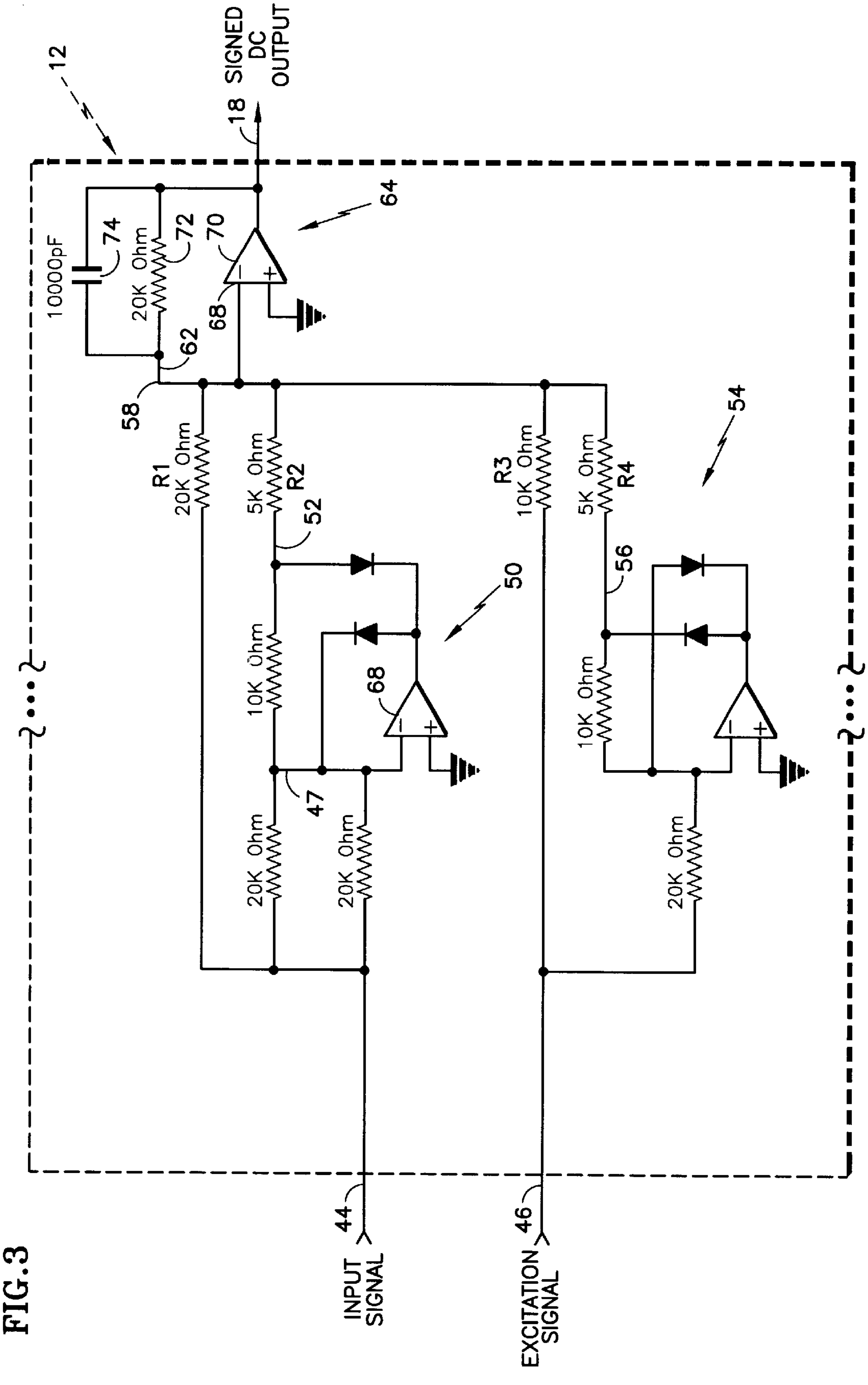
FIG. 3 is a detailed schematic illustration of one embodiment of the converter circuit.

FIG. 3 is a detailed schematic illustration of one embodiment of the converter circuit 12. As shown, the AC excitation signal on the line 46 and the input signal in the line 44 are input to the summing node of an operational amplifier 68 to provide the resultant summed signal on the line 49. The resultant summed signal is rectified to provide the rectified summed excitation and input signal on the line 52. The operation of this type of wave rectifier circuit is well known. For example, see *Analysis and Design of Analog Integrated Circuits,* Second Edition, Gray et al, John Wiley & Sons. pgs. 587–590. The excitation signal on the line 46 is input to the rectifier 54, which provides the rectified excitation signal on the line 56.

Referring still to FIG. 3, in this embodiment the half-wave rectifiers 50, 54 are transformed to full-wave rectifiers by the addition of the excitation signal on the line 46 and the input signal on the line 44. Therefore, an inverted full-wave rectified excitation signal and a non-inverted full-wave rectified summed excitation and input signal are input to a difference circuit that includes resistors R1, R2, R3 and R4, amplifier 70 and feedback resistor 72. The opamp 70 includes the resistor 72 and a capacitor 74 that together define a first order lowpass filter that provides the sensed position signal on the line 18. Significantly, the sensed position signal on the line 18 is a signed DC voltage that is indicative of effector position (i.e., the transducer position). The values of the resistor 72 and capacitor 74 are selected to recover the DC component of the summed signal on the line 58, and provide the recovered DC component as the sensed position signal on the line 18. In addition, the component values (e.g., the resistor values) in the converter are selected such that if the input signal is in phase with the excitation signal on the line 46 then the value of the signal on the line 18 will be greater than zero vdc. However, if the input signal on the line 44 is 180° out of phase with the excitation signal then the value of the signal on the line 18 will be less than zero vdc. Note that the input signal and the excitation will be either in-phase or 180° out-of-phase depending upon which side of the null the iron core 36 (FIG. 1) of the transducer is positioned. It should be noted that there may be some ripple on the sensed position signal on the line 18. This may be reduced by utilizing a higher order low pass filter, or decreasing the break frequency of the filter to increase the attenuation of the excitation frequency and harmonics thereof.

Although the present invention has been discussed in the context of use with an LVDT the present invention is certainly not so limited. The converter of the present invention may be used with transducers such as LVDTs, RVDTs and RLTs. These transducers include dual coils that may be connected in series opposition to provide an output signal that can be in-phase or out-of phase depending upon which side of null the iron core is displaced. The present invention may also be used with multi-coil transducers such as resolvers and synchros that inherently provide over their nominal range of displacement both in-phase and out-of-phase output signals from a single winding. In this case multiple converters, one for each winding, would be employed to obtain multiple signed DC outputs. In addition, although the present invention has been discussed in the context of a preferred circuit embodiment, one of ordinary skill will recognize that various circuit topologies may be utilized to perform the computations provided by the AC-to-DC converter of the present invention. It is contemplated that either half-wave or full-wave rectifiers may be used. For example, one half-wave embodiment may rectify the same half-cycle of the AC waveform in both the rectifiers, while another half-wave embodiment may rectify on opposite half cycles. In addition, one of ordinary skill will recognize that the inverting and non-inverting characteristics of the rectifiers may be selected to ensure a desired output signal polarity. Further, it is contemplated that a differential amplifier may be used to perform a subtraction operation utilizing like inverted and non-inverted inputs, as opposed to the summing amplifier with one inverted input and one non-inverted input resulting in a subtraction operation as shown in FIG. 3

Although the present invention has been shown and described with respect to several preferred embodiments thereof, various changes, omissions and additions to the form and detail thereof, may be made therein, without departing from the spirit and scope of the invention.

What is claimed is:

1. An apparatus for obtaining phase and amplitude signal information from a displacement transducer that is excited by an AC excitation signal and provides an AC input signal indicative of transducer position, said apparatus comprising:

a first rectifier circuit that receives and sums the AC excitation signal and the AC input signal, and rectifies the sum to provide a rectified summed excitation and input signal indicative thereof;

a second rectifier circuit that receives and rectifies the AC excitation signal and provides a rectified excitation signal indicative thereof; and a summing circuit that receives and determines the differences between said rectified summed excitation and input signal and said rectified excitation signal to provide a signed DC signal indicative of displacement transducer position.

2. The apparatus of claim 1, wherein said summing circuit comprises an electrical current summing node.

3. The apparatus of claim 1, wherein said first rectifier circuit comprises an inverting half-wave rectifier.

4. The apparatus of claim 3, wherein said second rectifier circuit comprises an inverting half-wave rectifier.

5. The apparatus of claim 4, wherein said summing circuit comprises a low-pass filter circuit that includes an operational amplifier having an inverting input and a non-inverting input, wherein said non-inverting input provides a current sensing node that receives the AC excitation signal, AC input signal, said rectified summed excitation and input signal and said rectified excitation signal to provide said signed DC signal.

6. The apparatus of claim 1, wherein said first rectifier circuit comprises a non-inverting full-wave rectifier.

7. The apparatus of claim 6, wherein said second rectifier circuit comprises an inverting full-wave rectifier.

8. An AC-DC converter circuit for obtaining phase and amplitude signal information from a displacement transducer that is excited by an AC excitation signal and provides an AC input signal indicative of transducer position, said converter circuit comprising:

a first rectifier circuit that receives the AC excitation signal and rectifies said AC excitation signal and provides a rectified excitation signal indicative thereof;

a second rectifier circuit of opposite polarity from said first rectifier circuit, wherein said second rectifier circuit receives and rectifies the AC input signal and provides a rectified sensor position signal indicative thereof;

means for summing the AC excitation signal, the AC signal, said rectified excitation signal and said rectified sensor position signal to provide a signed summed signal; and means for filtering said signed summed signal to provide a filtered signal indicative of displacement transducer position.

9. The AC-to-DC converter of claim 8, wherein said means for filtering comprises an active low pass filter.

10. The AC-to-DC converter of claim 8, wherein said first rectifier circuit comprises a non-inverting half-wave rectifier, and said second rectifier circuit comprises an inverting half-wave rectifier.

11. Apparatus for AC-to-DC conversion that receives an AC excitation signal and an AC input signal from a transducer excited by the AC excitation signal, and provides a signed DC signal indicative of transducer position, said apparatus comprising:

an inverting rectifier circuit that receives the AC excitation signal and the AC input signal and rectifies the sum of the AC excitation signal and the AC input signal to provide a rectified summed excitation and input signal indicative thereof;

a non-inverting rectifier circuit that receives and rectifies the AC excitation signal and provides a rectified excitation signal indicative thereof; and a current summing circuit that receives and sums said rectified summed excitation and input signal and said rectified excitation signal and provides a summed current signal that is filtered to provide the signed DC signal.

* * * * *